United States Patent
Holman et al.

(10) Patent No.: US 9,081,190 B2
(45) Date of Patent: Jul. 14, 2015

(54) VOLTAGE CONTROLLED MICROLENS SHEET

(75) Inventors: Robert L. Holman, San Jose, CA (US); Matthew B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 13/457,263

(22) Filed: Apr. 26, 2012

(65) Prior Publication Data

US 2013/0286661 A1 Oct. 31, 2013

(51) Int. Cl.
*G02B 26/02* (2006.01)
*G02B 26/08* (2006.01)
*G02F 1/01* (2006.01)
*G02F 1/1335* (2006.01)
*G02F 1/29* (2006.01)
*F21V 8/00* (2006.01)

(52) U.S. Cl.
CPC .......... *G02B 26/0875* (2013.01); *G02B 6/0053* (2013.01); *G02F 1/0131* (2013.01); *G02F 1/133606* (2013.01); *G02F 1/29* (2013.01); *G02B 6/0028* (2013.01); *G02F 2001/133607* (2013.01); *Y10T 156/10* (2015.01)

(58) Field of Classification Search
CPC .... G02B 26/08; G02B 26/00; G02B 26/0875; G02B 6/0028; Y10T 156/10; G02F 2001/133607
USPC .............................. 362/606–607, 330; 359/676
See application file for complete search history.

(56) References Cited

U.S. PATENT DOCUMENTS

| | | | |
|---|---|---|---|
| 3,716,359 | A | 2/1973 | Sheridon |
| 6,812,624 | B1 | 11/2004 | Pei et al. |
| 6,903,872 | B2 | 6/2005 | Schrader |
| 6,930,817 | B2 | 8/2005 | Srinivasan et al. |
| 7,054,054 | B1 | 5/2006 | Srinivasan et al. |
| 2006/0066934 | A1 | 3/2006 | Selbrede |

(Continued)

FOREIGN PATENT DOCUMENTS

| | | |
|---|---|---|
| EP | 1925963 A1 | 5/2008 |
| WO | WO-2004059364 A1 | 7/2004 |
| WO | WO-2010015093 A1 | 2/2010 |

OTHER PUBLICATIONS

International Search Report and Written Opinion—PCT/US2013/037839—ISA/EPO—Aug. 16, 2013.

(Continued)

*Primary Examiner* — Diane Lee
*Assistant Examiner* — Gerald J Sufleta, II
(74) *Attorney, Agent, or Firm* — Knobbe Martens Olson & Bear LLP

(57) ABSTRACT

This disclosure provides systems, methods and apparatus relating to implementations of an electrically controlled light conditioning sheet. In one aspect, the electrically controlled light conditioning sheet includes a planar electrode having a first conductor and a second conductor and a transmissive elastic layer. The transmissive elastic layer is configured to deform in response to a potential difference applied between the first and the second conductor and produce regions of optical refractive power. The angular spread and/or the radiation pattern of an incoming beam of light incident on the electrically controlled light conditioning sheet is altered by the action of the regions of optical refractive power produced by the applied potential difference.

26 Claims, 10 Drawing Sheets

(56) References Cited

U.S. PATENT DOCUMENTS

| | | |
|---|---|---|
| 2009/0086331 A1 | 4/2009 | Gunasekaran et al. |
| 2009/0295268 A1 | 12/2009 | Peng |
| 2010/0053959 A1 | 3/2010 | Ijzerman et al. |
| 2010/0315833 A1 | 12/2010 | Holman et al. |
| 2011/0096570 A1 | 4/2011 | Vissenberg et al. |
| 2012/0250151 A1* | 10/2012 | Lee et al. ............ 359/463 |
| 2013/0143254 A1 | 6/2013 | Thomas et al. |
| 2013/0155002 A1 | 6/2013 | Yang |

OTHER PUBLICATIONS

Carpi, et al., "Bioinspired Tunable Lens with Muscle-Like Electroactive Elastomers" Advanced Functional Materials, vol. 21(21), Nov. 8, 2011, pp. 4152-4158.

Ha J-Y., et al., "Fabrication of an Optical Grating Using High Electrostrictive Strain Polymer as a Template" Journal of Optics A: Pure and Applied Optics [Online] 2007, 9, pp. 170-173.

Kofod., et al., "Optical Transmission Gratings Tuned by Electro Active Polymers" Solid Dielectrics (ICSD), 2010 10th IEEE International Conference [Online] Jul. 4-9, 2010, pp. 1-4.

Written Opinion—PCT/US2013/037839—ISA/EPO—Jul. 5, 2014.

Wikipedia, the free encyclopedia, "Optical Power", as retrieved on Oct. 10, 2014, http://en.wikipedia.org/wiki/Optical Power.

Wikipedia, the free encyclopedia, "Focal Length", as retrieved on Oct. 10, 2014, http://en.wikipedia.org/wiki/Focallength.

International Preliminary Report on Patentability dated Sep. 9, 2014 in PCT/US2013?037839.

* cited by examiner

VOLTAGE CONTROLLED MICROLENS SHEET

TECHNICAL FIELD

This disclosure relates to the field of illumination systems and luminaires and more particularly to electrically controlled films and/or sheets including micro-optics that can condition the light output by illumination systems and luminaires.

DESCRIPTION OF THE RELATED TECHNOLOGY

The state of illumination systems and luminaires used in indoor and outdoor residential or commercial lighting applications has not changed appreciably over the years. Standard illumination systems and luminaires can be large, heavy and bulky. Moreover, it is not possible to easily change the illumination pattern provided by standard illumination systems and luminaires which can result in achieving net illumination efficiencies far lower than desired from a modern energy conservation perspective. For example, even though a given lighting application may require illumination held predominately to a limited geometric area (e.g. table top or work area), light from the illumination system or luminaire is directed over a larger area resulting in a portion of the light output to be wasted.

Illumination systems and luminaires that can provide different illumination patterns for wide area lighting, spot lighting, flood lighting, task lighting, wall washing, etc. have been developed. Such illumination systems and luminaires can employ lenticular sheets and/or films having fixed lens shapes to tailor the illumination pattern. To change the illumination pattern, for example from flood lighting to task lighting, can require manual exchange of one type of lenticular sheet and/or film for another type of lenticular sheet and/or film.

SUMMARY

Illumination systems and luminaires whose illumination patterns can be electronically controlled illumination patterns are desirable since manually exchanging one type of lenticular sheet and/or film for another type of lenticular sheet and/or film can be cumbersome and/or may not be possible.

The systems, methods and devices of the disclosure each have several innovative aspects, no single one of which is solely responsible for the desirable attributes disclosed herein.

One innovative aspect of the subject matter described in this disclosure can be implemented in a transmissive light conditioning film comprising a transmissive substrate; an electrode and a transmissive elastic layer. In various implementations, the electrode can be planar. The electrode includes a first conductor and a second conductor. The first conductor is electrically insulated from the second conductor. The electrode is configured to produce an electric field between the first conductor and the second conductor when a potential difference is applied between the first conductor and the second conductor. The transmissive elastic layer is configured to deform and produce regions of refractive power in response to the electric field. The regions of refractive power are configured to change angular divergence of an input light beam transmitted through the light conditioning film.

In various implementations, the first conductor and/or the second conductor can include a plurality of conductive extensions. In various implementations, each of the plurality of conductive extensions of the first conductor can be adjacent to at least one of the plurality of conductive extensions of the second conductor. In various implementations, each of the plurality of conductive extensions of the second conductor can include an arcuate region that partially surrounds a conductive extension of the second conductor. In various implementations, the regions of refractive power are configured to increase the angular divergence of the input light beam, $\pm\delta\theta_{in}$ where $\delta\theta_{in}$ is less than 15 degrees from a normal to a surface of the light conditioning film. In various implementations, the light conditioning film is configured to output a light beam having an angular spread $\pm\delta\theta_{out}$. In various implementations, $\delta\theta_{out}$ can be greater than $\delta\theta_{in}$. In various implementations, $\delta\theta_{out}$ can be greater than about 40 degrees. In various implementations, $\delta\theta_{out}$ can be greater than about $1.5\delta\theta_{in}$. In various implementations, the electrode can be disposed over the transmissive substrate. In various implementations, the elastic layer can be disposed over the electrode. In various implementations, the electrode can be embedded in the elastic layer. In various implementations, the transmissive substrate can include a region having optical power. In various implementations, in the absence of an applied electric field, the transmissive light conditioning film can include at least one region having optical power. In various implementations, the deformation of the elastic layer can produce multiple peaks and valleys to form a plurality of substantially cylindrical lenticules. In various implementations, a peak-to-valley deformation of the elastic layer can be less than about 10% of a thickness of the elastic layer. In various implementations, the electrode can include a plurality of interdigitated lines. In various implementations, a number of the plurality of interdigitated lines per millimeter of the electrode can be between 40 lines per mm and 200 lines per mm. Adjacent interdigitated lines can be spaced apart by a distance that is between approximately 5 µm and approximately 25 µm. In various implementations, the light conditioning film is configured such that a region of refractive power is produced between adjacent interdigitated lines. In various implementations, the regions of refractive power can have a pitch that is greater than about 5 times the largest wavelength of interest of the input beam. In various implementations, the regions of optical refractive power can have a pitch that is greater than about 10 times the wavelength of the input beam. In various implementations, at least some of the regions of refractive power can have a size between approximately 5 µm and approximately 25 µm. In various implementations, the electrode can be at least partially transmissive to light in the visible spectral range.

Another innovative aspect of the subject matter described in this disclosure can be implemented in a lighting device comprising various implementations of the light conditioning film described above and control electronics configured to apply a voltage to the electrode to generate the applied electric field. The lighting device can include a fixture adapted to receive a light source that is configured to provide an input light beam to the lighting device.

Another innovative aspect of the subject matter described in this disclosure can be implemented in a transparent light conditioning film comprising a transparent substrate; means for generating an electric field and means for producing regions of optical refractive power in response to the electric field generated by the generating means. The regions of optical refractive power can be configured to change angular divergence of an input light beam that is transmitted through the light conditioning film. In various implementations, the generating means can include an electrode. In various implementations, the means for producing regions of optical refractive power can include an elastic layer.

Another innovative aspect of the subject matter described in this disclosure can be implemented in a method of changing angular divergence of a light beam input on a light conditioning film. The method can include the following procedures: applying a potential difference between a first conductor and a second conductor of an electrode included in the light conditioning film; allowing an elastic layer included in the light conditioning film to deform in response to the electric field to produce regions of optical refractive power; and passing the input beam of light through the regions of optical refractive power such that light transmitted from the light conditioning film has an angular divergence that is different from the angular divergence of the input beam of light.

In various implementations, the procedure of applying the potential difference can include applying an electrical current or an electrical voltage that has a shape selected from a group consisting of DC, sinusoidal shape, square shape and triangle shape. As discussed above, the electrode can includes a plurality of interdigitated lines and the procedure of applying the electric field can include generating a potential difference between adjacent interdigitated lines. As discussed above, in various implementations, the regions of optical refractive power can have a pitch that is at least 5 times the largest wavelength of interest of the input light beam.

Another innovative aspect of the subject matter described in this disclosure can be implemented in a method of manufacturing a light conditioning film. The method can include the following procedures: providing a transmissive substrate having a transmissive elastic layer over the substrate and disposing an electrode pattern over one of the substrate and the elastic layer. As discussed above, the elastic layer can be configured to deform and produce regions of optical refractive power in response to a potential difference applied across adjacent conductors in the electrode pattern. The regions of optical refractive power can change an angular divergence of light incident on the light conditioning film and passing through the elastic layer.

In various implementations, the procedure of providing the transmissive substrate having a transmissive elastic layer can include disposing the elastic layer over the substrate by way of at least one of: compression molding, casting, spin-coating, and dip coating. In various implementations, the procedure of disposing the electrode can include at least one of: thin film processing, patterning, and lithography. In various implementations, the electrode can be adhered to the substrate. In various implementations, the electrode can be at least partially embedded in the substrate. In various implementations, the electrode can be at least partially embedded in the elastic layer. In various implementations, the electrode pattern can be disposed over the elastic layer. In various implementations, a second electrode pattern can be disposed on a surface above over the electrode pattern.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Example implementations disclosed herein are illustrated in the accompanying schematic drawings, which are for illustrative purposes only.

Like reference numbers and designations in the various drawings indicate like elements.

DETAILED DESCRIPTION

Figure 1A:
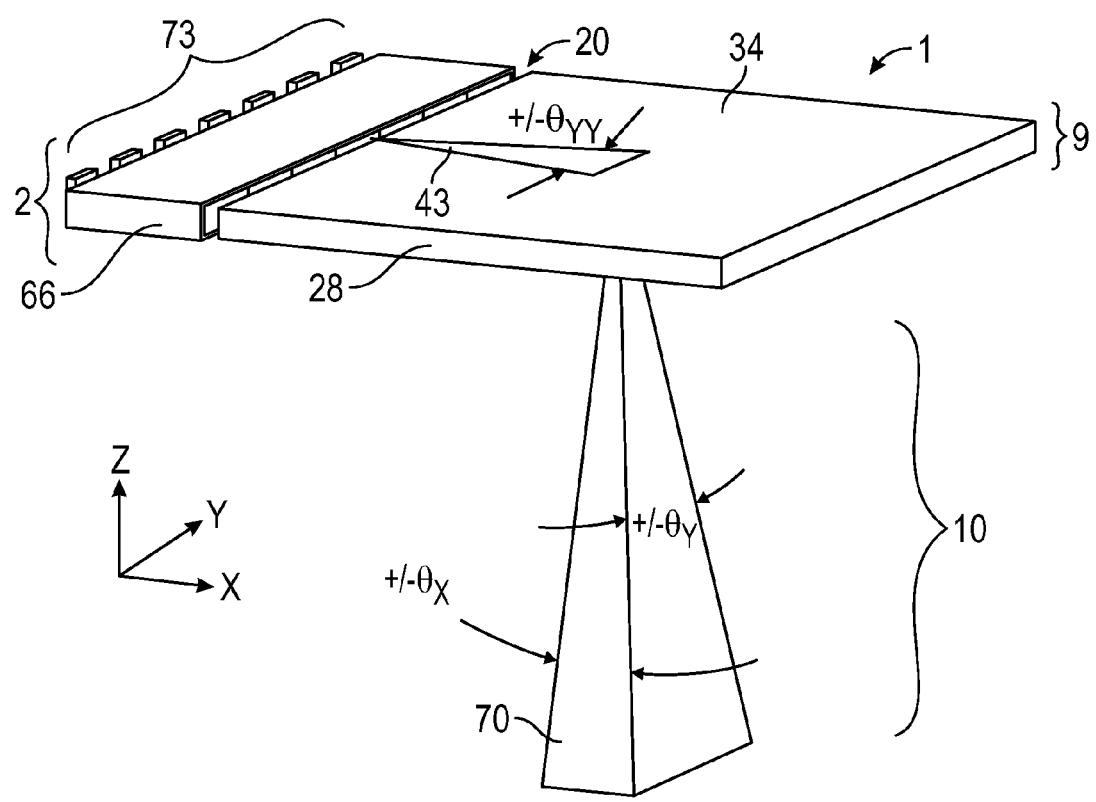
FIG. 1A illustrates a perspective view of an implementation of an illumination system including multiple light emitting elements as input and a light distributing plate that outputs a beam of square or rectangular collimated light from one plate surface.

The following detailed description is directed to certain implementations for the purposes of describing the innovative aspects. However, the teachings herein can be applied in a multitude of different ways. As will be apparent from the following description, the innovative aspects may be implemented in any device that is configured to provide illumination. More particularly, it is contemplated that the innovative aspects may be implemented in or associated with a variety of applications such as commercial or residential lighting. Implementations may include but are not limited to lighting in offices, schools, manufacturing facilities, retail locations, restaurants, clubs, hospitals and clinics, convention centers, hotels, libraries, museums, cultural institutions, government buildings, warehouses, military installations, research facilities, gymnasiums, sports arenas, backlighting for displays, signage, billboards or lighting in other types environments or applications. Additionally, illumination systems including various implementations of electrically controlled light conditioning sheets described herein can be incorporated in or used as a building material, such as, for example, walls, floors, ceilings of residential and commercial structures. Other uses are also possible.

As discussed more fully below, various implementations described herein include an electrically controlled light conditioning sheet that can be coupled to a light source (for example, a light emitting diode (LED) or a collimated source of light). The electrically controlled light conditioning sheet can be used to adjust the angular spread and/or radiation pattern (for example, far field or near field radiation pattern) of the light output. Various implementations of the electrically controlled light conditioning sheet include an optional transmissive substrate, an electrode and a transmissive elastic layer. In various implementations, the electrode can be planar. The electrode can be transmissive, partially transmissive, or opaque. The electrode can be configured to absorb/reflect/scatter less than approximately 10% of the incident light. The elastic layer can wrinkle, deform or corrugate in response to an electric field generated by, for example, applying an electrical voltage or an electrical current to the electrode. The elastic layer can deform to produce regions of refractive power (for example, prismatic features, optical features having facets, spherical, cylindrical, elliptical, parabolic, hyperbolic, sinusoidal, or other curve shaped lenses/lenslets, or elongated lenticules including cylindrical or semi-cylindrical structures with a semi-circular, semi-elliptical, parabolic, hyperbolic, conicoidal, sinusoidal, or other curved cross section) such that the angular spread and/or the radiation pattern (for example, far field or near field radiation pattern) of light that is incident on the substrate is changed when transmitted through the elastic layer. In various implementations, the elastic layer can be planar and not include any regions of refractive power. In various implementations, the elastic layer can include regions of refractive power and application of a potential difference can change (for example, increase) the refractive power of these regions or create new regions of refractive power. In various implementations, the substrate can be planar and not include any regions of refractive power. However, in some implementations, the substrate can include regions of refractive power such that the angular spread and/or the radiation pattern (for example, far field or near field radiation pattern) of light transmitted through the substrate are changed. Various implementations of the electrically controlled light conditioning sheet can have a cross-sectional thickness of less than approximately 1 cm, 1 mm, 100 μm, 25 μm, 10 μm, 0.5 μm or less and can be light weight. In some implementations, the electrically controlled light conditioning sheet can have a mean cross-sectional thickness of about 12 μm to 100 μm, or 100 μm to 250 μm, although other thicknesses are possible. Accordingly, illumination systems and luminaires including implementations of the electrically controlled light conditioning sheet described herein can be compact, light weight and have a slim profile.

Particular implementations of the subject matter described in this disclosure can be implemented to realize one or more of the following potential advantages. One method to change the angular spread or the radiation pattern (for example, near field or far field radiation pattern) of light output from a source of illumination (such as a highly collimated light engine) is to use lens sheets having lenses with fixed lens shapes or lenticular lenses with fixed lenticular cross sections. To change the angular spread and/or the radiation pattern, for example from flood lighting to task lighting, can require manual exchange of one type of lens sheet having lenses of a first shape for another type of lens sheet having lenses of a second shape. Manually exchanging one type of lens sheet for another type of lens sheet can be cumbersome and/or may not be possible. Moreover, manually exchanging one type of lens sheet for another type of lens sheet does not allow for changing angular spread or radiation pattern of the output light quickly. Various implementations of the electrically controlled light conditioning sheets described herein can allow for changing angular spread or radiation pattern of the output light quickly, for example, at the touch of a button or a turn of a knob. For example, a user may adjust the angular spread and/or the radiation pattern by adjusting a wall switch or a remote control in wireless communication with the electrically controlled light conditioning sheets. These can be useful in commercial, residential, indoor or outdoor lighting. Moreover, since a single electrically controlled light conditioning sheet can be used to provide a wide range of radiation patterns, the implementations described herein can be cost-effective. Additionally, various implementations of the electrically controlled light conditioning sheet can be thin and light weight thereby allowing for illumination systems and luminaires that are slim and compact. Furthermore, various implementations of the electrically controlled light conditioning sheets described herein can be used to change the angular spread and/or the radiation pattern remotely which can be useful in some applications.

FIG. 1A illustrates a perspective view of an implementation of an illumination system including multiple light emitting elements as input and a light distributing plate that outputs a beam of square or rectangular collimated light from one plate surface. The illumination system 1 illustrated in FIG. 1A includes a light source 2 including multiple light emitting elements 73 and a coupling optic 66, however, in some implementations a single light emitting element can be used. As illustrated, the light source 2 is an edge light source, however, in some implementations (for example, where the light guide is circular), one or more light emitting elements may be disposed in or near the center of the light guide rather than an edge. The light output by the light source 2 is input to a light distributing plate 9 and is emitted as a beam 10 of square or rectangular collimated light from a surface of the light distributing plate. The multiple light emitting elements 73 can include fluorescent bulbs, LEDs, or a collimated source of light. The coupling optic 66 can include one or more of: a light bar, a light pipe, a rectangular etendue-preserving angle-transforming reflector (RAT) and optical elements (for example, lenses, collimators, etc.). In various implementations, the light emitted by the light source 2 can be collimated in one or more meridians or planes.

The light distributing plate 9 can include a light guide 28 and a light extracting sheet (not separately shown). Light emitted from the light source 2 is injected into one or more edges of the light guide 28 and guided across the light guide 28 by multiple total internal reflections from the top and bottom surfaces. The light guide 28 can have a top surface and a bottom surface and include a plurality of edges between the top and the bottom surfaces. The top and bottom surface and the plurality of edges can be polished to increase light coupling and light guiding efficiencies. A light extracting sheet can be disposed over the top or bottom surface of the light guide 28. In some implementations, the light extracting sheet can be adhered to the top or bottom surface of the light guide 28. The light extracting sheet can include optical features (for example, surface or volume diffractive features, refractive features, holograms, etc.) that can direct light propagating through the light guide 28 by total internal reflection or specular reflection from the top and/or bottom surfaces out of the light distributing plate 9. In various implementations, the design of the light distributing plate 9 and/or the light extracting sheet can be such that the extracted light is collimated in one or more meridians. In various implementations, the top and bottom surfaces of the light guide 28 can be parallel to each other. However, in various other implementations, the top and bottom surfaces of the light guide 28 can be oriented at an angle with respect to each other. For example, in some implementations, the light guide 28 can be wedge shaped in cross section (for example, in the XZ-plane). In such implementations, the wedge design can provide the light extraction functionality, in which case, in some implementations, a light turning sheet may be used in addition to or instead of the light extracting sheet. In some implementations, the distribution plate 9 can be circular, and the light source can be disposed near a center of the circular distribution plate 9.

In the implementation illustrated in FIG. 1A, the light source 2 is disposed adjacent an edge of the light distributing plate 9 such that an air gap 20 is included between the light source 2 and the edge of the light distributing plate 9. However, in various implementations, the light source 2 can be disposed adjacent one or more edges of the light distributing plate 9 without including an air gap. In the illustrated implementation, light emitted from the light source 2 is injected into the light distributing plate 9 as beam 43. The light emitted from the light source 2 is collimated such that the angular spread of the beam 43 in the light distributing plate 9 is $\pm\theta_{YY}$ with respect to a normal to the face of the light distributing plate 9 in which light is injected into the light distributing plate 9. As beam 43 passes through the length and volume of the light guide 28, it can be extracted and/or turned out of the light distributing plate 9 from its initial propagating direction having a significant X-axis component to a direction having a significant Z-axis component as beam 10 by the action of light extracting film and/or turning film. The beam 10 can be doubly collimated in the vertical ZX plane narrowing to angular width $\pm\theta_X$ (in air) with respect to a vector normal to the XY-plane and in the vertical ZY plane narrowing to angular width $\pm\theta_Y$ (in air) with respect to a vector normal to the XY-plane. In some implementations, the beam is highly collimated. In some implementations a highly collimated beam in a given plane has a full width half maximum of $\pm 5°$ about a vector pointing in the direction of maximum beam intensity. In some implementations, the collimated beam in a given plane has a full width half maximum of between $\pm 5°$ and $\pm 45°$ about a vector pointing in the direction of maximum beam intensity.

The light distributing plate 9 and the coupling optic 66 can include transmissive materials that allow propagating of light emitted by the light emitting elements 73. For example, the light distributing plate 9 and the coupling optic 66 can include optically transmissive materials such as, for example, glass, plastic, acrylic, polycarbonate, etc. The illumination system 1 can be designed to be compact and light weight. For example, in various implementations where the light emitting elements 73 include LEDs or LED-based systems, the thickness of the coupling optic 66 and the light distributing plate 9 can be in the range of approximately 5-20 mm.

Figure 1B:
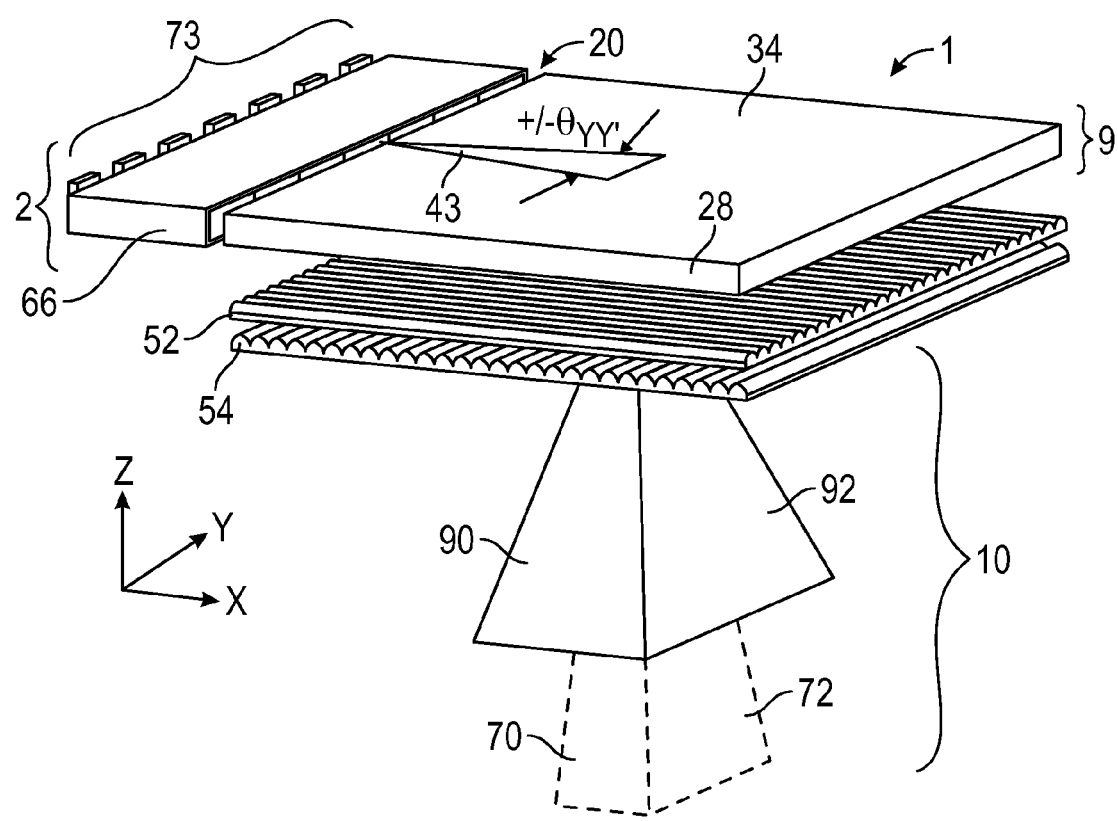
FIG. 1B illustrates a perspective view of an implementation of the illumination system illustrated in FIG. 1A with the addition of two angle-spreading sheets below the lighting distributing plate to process the outgoing beam profile in one or both output meridians.

The angular spread or the radiation pattern (for example far field or near field radiation pattern) of the output beam 10 can be adjusted or varied by including one or more angle-spreading sheets. FIG. 1B illustrates a perspective view of an implementation of the illumination system illustrated in FIG. 1A with the addition of two angle-spreading sheets below the lighting distributing plate to process the outgoing beam profile in one or both output meridians. A meridian can be a Cartesian plane formed by two orthogonal axes. For example, a meridian can be formed by the x-axis and the y-axis, the z-axis and the x-axis, the y-axis and the z-axis. In various implementations, a meridian can refer to specific planes in an optical system. In various implementations, a meridian can also refer to an arc on a sphere which defines a meridional plane. In some implementations of optical systems, a plane that includes the optical axes is referred to as the meridional plane. In the implementation illustrated in FIG. 1B, two angle-spreading sheets 52 and 54 are disposed below the bottom surface of the light guide 28. The angle-spreading sheets 52 and 54 can be designed to have a thickness in the range of approximately 0.05 mm-1.0 cm. Accordingly, the angle-spreading sheets 52 and 54 can add very little thickness to the overall thickness of the illumination system 1. In various implementations, the angle-spreading sheets 52 and 54 can include optical refractive features (for example prismatic features, optical features having facets, spherical, elliptical, parabolic, sinusoidal, or other curve shaped lenslets and spherical, conicoidal, hyperbolic, elliptical, parabolic, sinusoidal, or other curve cross-sectional semi-cylindrical elongated lenticules) that can change the profile of the output beam 10 by using the phenomenon of refraction and bending light according to Snell's law of refraction. In various other implementation, the angle-spreading sheets 52 and 54 can include optical diffractive features (for example, highly asymmetric light shaping diffusers based on holographic principles) that can change the profile of the output beam 10 by using the phenomenon of diffraction and bending light according to Bragg's law of diffraction. In some implementations, angle-spreading sheets including optical refractive features can be configured to change the angular spread of light passing through them in only one meridian and not in the other, for example a sheet of elongated semi-cylindrical lenticules configured to spread light in a meridian perpendicular to the axial direction in which the lenticule extends, the lenticule having no optical power in the axial direction. In other implementations, angle-spreading sheets including optical refractive features can be configured to change the angular spread of light passing through them in more than one meridian. For example angle spreading sheets including a plurality of lenslets oriented along two orthogonal directions can be used to change the angular spread of light passing through it in more than one meridian.

Orienting the angle-spreading sheets such that the optical axis of the optical refractive features are oriented substantially orthogonal to each other can allow for a complete family of wider far field beam patterns to be achieved. For example, in the implementation illustrated in FIG. 1B, the angle-spreading sheets 52 and 54 are oriented such that the angle-spreading sheet 52 changes the angular spread of the output beam 10 in the ZY plane while angle-spreading sheet 54 changes the angular spread of the output beam 10 in the ZX plane. Accordingly, the square or rectangular shape of the output beam 10 is preserved while the angular width of the output beam 10 is increased. In FIG. 1B, the widened profile of the output beam 10 after passage through the angle-spreading sheets 52 and 54 is indicated by solid lines and reference numerals 90 and 92 while the profile of the output beam 10 before passage through the angle-spreading sheets 52 and 54 is indicated by dotted lines and reference numerals 70 and 72.

The angle-spreading sheets 52 and 54 can include material that is transmissive to light such as, for example, glass, plastic, acrylic, polycarbonate, etc. The angle-spreading sheets 52 and 54 can be formed by methods such as embossing, casting and curing process, lithography, stamping, etc. In various implementations, one, some or all of the angle-spreading sheets 52 and 54 can be electrically controlled light conditioning sheets as described below.

Figure 2A:
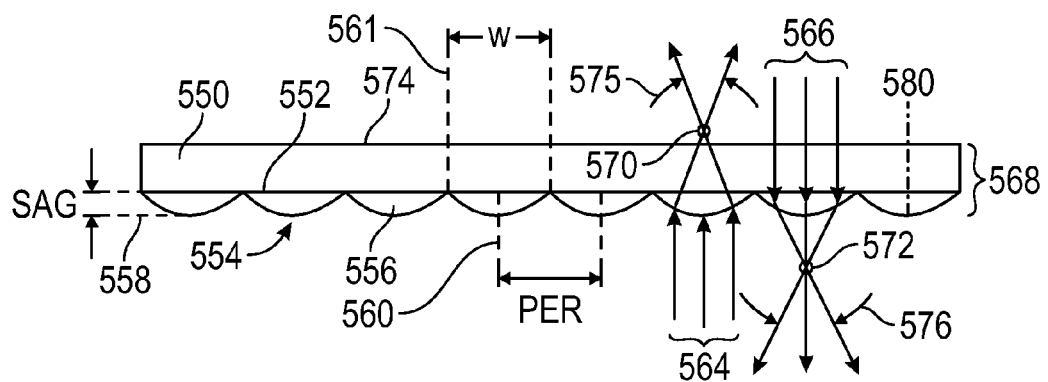
FIG. 2A represents a schematic cross-sectional side view of an implementation of a lenticular lens sheet including semi-cylindrical lens elements having a semi-circular cross-sectional surface.
Figure 2B:
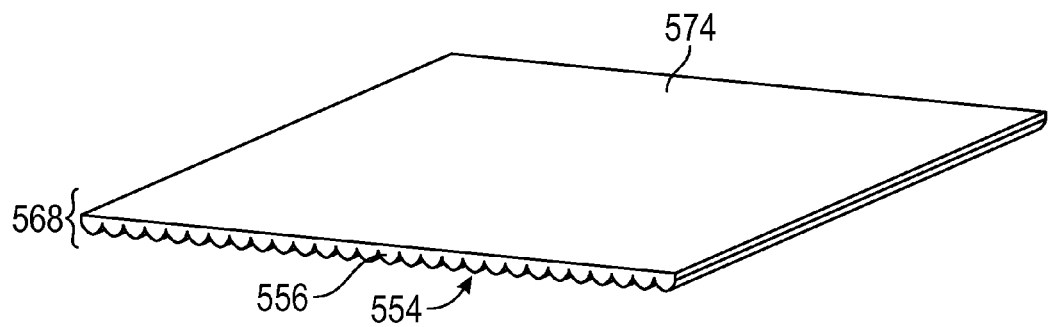
FIG. 2B provides a perspective view of the implementation illustrated in FIG. 2A.

FIG. 2A represents a schematic cross-sectional side view of an implementation of a lenticular lens sheet including semi-cylindrical lens elements having a semi-circular cross-sectional surface. In various implementations, a lenticular lens sheet includes a substrate (for example, a layer, a film or a plate) with two-dimensional or three-dimensional lens elements disposed on a surface of the substrate. In various implementations, the lens elements can include elongated semi-cylindrical lenses or semi-spherical lenses. The elongated semi-cylindrical lenses can have semi-circular, parabolic or semi-elliptical cross section. The lens sheet 568 illustrated in FIG. 2A can be a sheet made of glass or a polymer including lens elements having a fixed shape or an electronically controlled light conditioning sheet described below. The lens sheet 568 illustrated in FIG. 2A includes an optically transparent film or sheet material 550 made of a polymer or glass composition whose plane surface 552 includes a micro structured array 554 of parallel lens cross-sections, each lens cross-section (sometimes called a lenticule or a lenticular) having generally identical cross-sectional shape 556, a height (SAG) 558 and a corresponding pitch or repeat-period (PER) 560. Each lens in the micro structured array 554 can have a cross-sectional width (W) 561. In some implementations, each lens in the micro structured array 554 can contact every other adjacent lens. In such implementations, the width (W) 561 of each lens in the micro structured array 554 can be equal to the pitch or repeat period (PER) 560. In some implementations, adjacent lenses in the micro structured array 554 are not in contact with each other. In such implementations, the pitch or repeat period (PER) 560 can be greater than the width (W) 561 of each lens in the micro structured array 554. FIG. 2A shows that ideal illustrative collimated rays 564 or 566 pass through lens sheet 568 parallel to surface normal 580 and are refracted by the optical power of the individual lens elements 556 in the array 554 through the corresponding focal points 570 or 572. These refracted light rays then diverge with increased angular extent 575 or 576 that, to only rough paraxial approximation, is a predictable function of the lens's characteristic focal length. FIG. 2B provides a perspective view of the implementation illustrated in FIG. 2A.

Figure 2C:
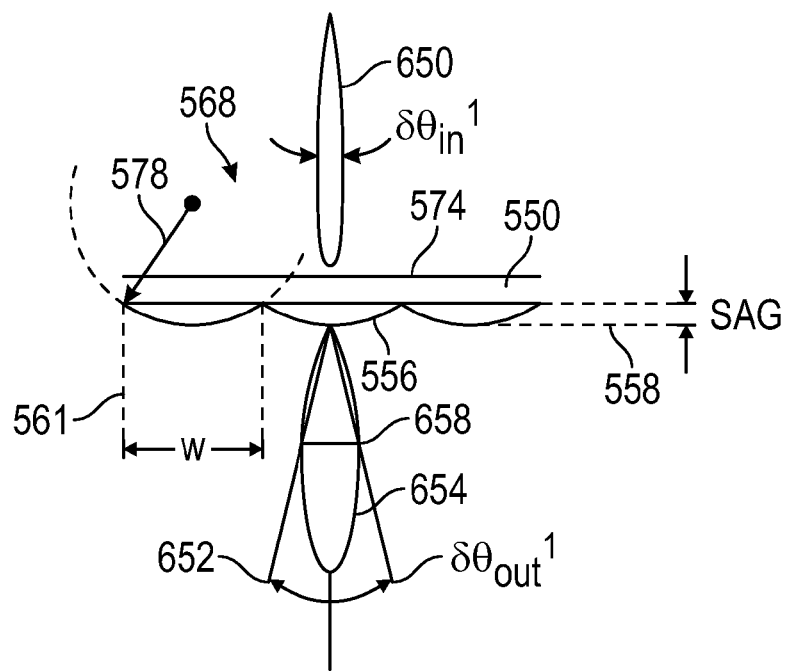
FIGS. 2C-2D shows the far field beam cross section that results when a beam of light having an angular spread of $\pm\delta\theta_{in}{}^{1}$ degrees is applied to an implementation of a lenticular lens sheet having semi-cylindrical shaped lens elements with a semi-circular cross-sectional surface as illustrated in FIGS. 2A and 2B.
Figure 2D:
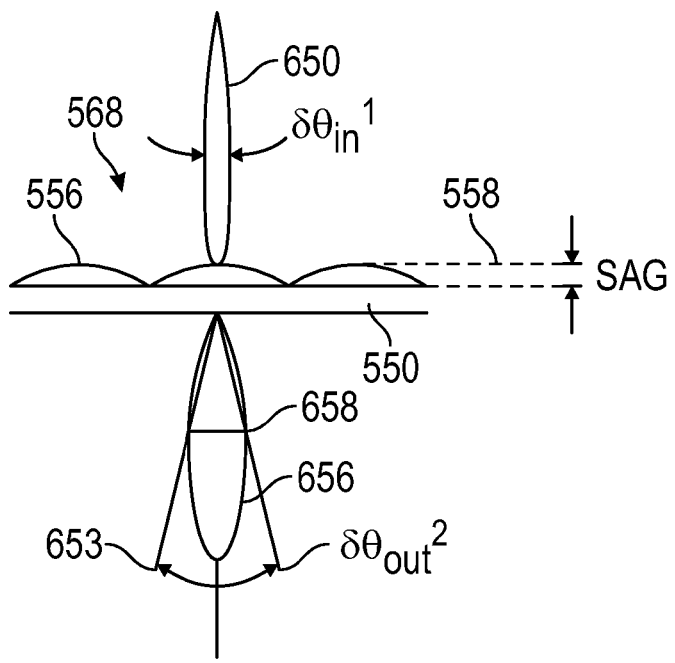

FIGS. 2C-2D shows the far field beam cross section that results when a beam of light having an angular spread of $\pm\delta\theta_{in}^1$ degrees is applied to an implementation of a lenticular lens sheet having semi-cylindrical shaped lens elements with a semi-circular cross-sectional surface as illustrated in FIGS. 2A and 2B. In various implementations, the input beam 650 can be generated by an illumination system similar to the illumination system 1 described above. In some implementations, the input beam 650 can be collimated in two meridians as discussed above with reference to FIG. 1A. FIG. 2C shows the far field beam cross section that results when an incoming beam 650 is applied to the plane surface 574 of the lens sheet 568. As shown in FIG. 2C, the angular spread 652 of an output beam 654 that results when the input beam of light 650 is applied to the plane surface 574 of the lens sheet 568 is increased from $\pm\delta\theta_{in}^1$ degrees with respect to a normal to $\pm\delta\theta_{out}^1$ degrees with respect to a normal to plane surface 574 by the action of the semi-cylindrical shaped lens elements having a semi-circular cross-sectional surface. The semi-circular cross-sectional surface of the semi-cylindrical shaped lens elements can have a cross-sectional radius of curvature 578 between approximately 0.1 mm and 0.5 mm. FIG. 2D shows the far field beams cross section that results when an incoming beam 650 is applied to the surface of the lens sheet 568 that includes the micro structured array 554. As shown in FIG. 2D, the angular spread 653 of an output beam 656 that results when the input beam of light 650 is applied to the surface of the lens sheet 568 that includes the micro structured array 554 is increased from $\pm\delta\theta_{in}^1$ degrees with respect to a normal to $\pm\delta\theta_{out}^2$ degrees with respect to a normal by the action of the semi-cylindrical shaped lens elements. In various implementations, the input beam can be collimated and have an angular spread of about ±5 degrees with respect to a normal. The output beam can have an angular spread between about ±10 degrees and about ±45 degrees. The far-field beam profile half width 658 is designated in FIGS. 2C and 2D.

As discussed above, the lens elements in angle-spreading sheets 52 and 54 can include a variety of different shapes. For example, the lens elements can be aspheric and include shallow parabolic lens elements, deeper parabolic lens elements, prism-like hyperbolic lens elements, etc., in shape or cross section.

Figure 3A:
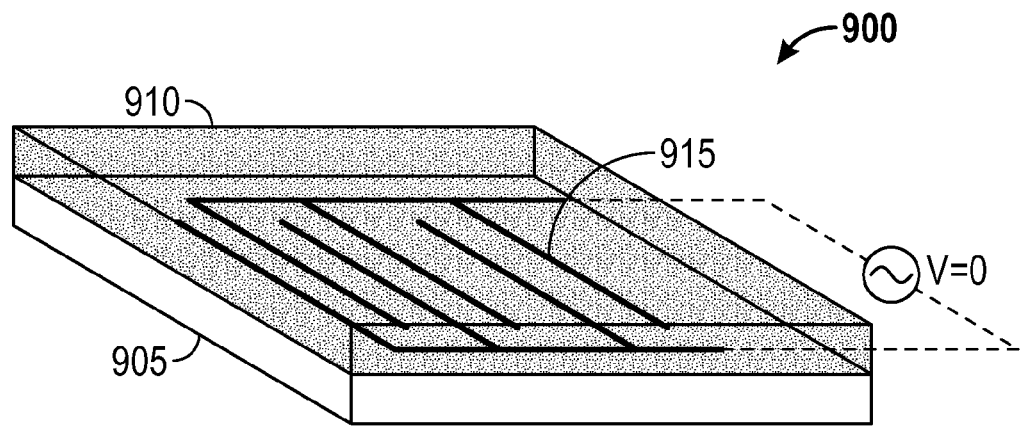
FIGS. 3A and 3B illustrate perspective views of an implementation of a light conditioning sheet that can be electrically controlled to adjust the angular spread and/or radiation pattern of the light output.
Figure 3B:
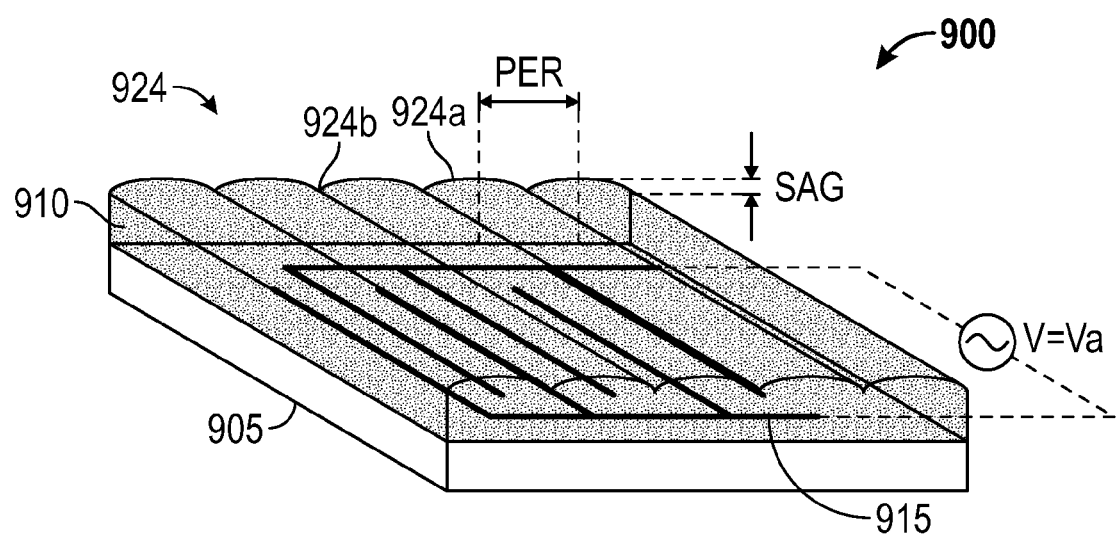
Figure 3C:
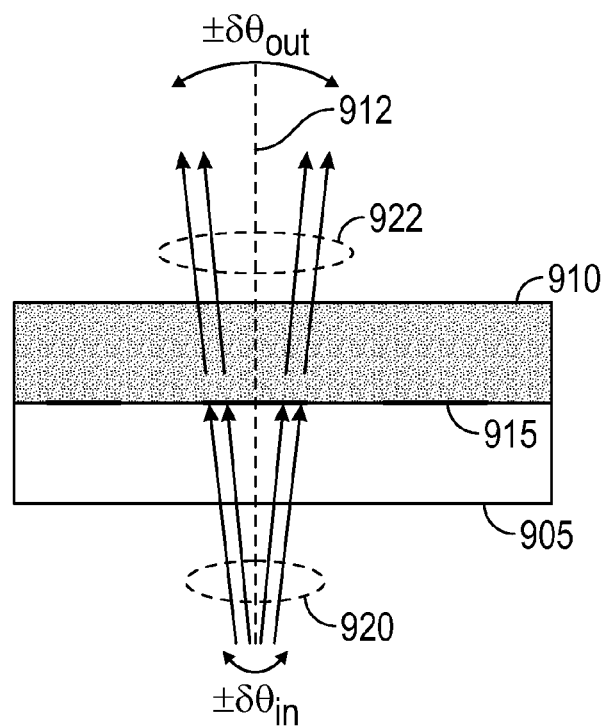
FIGS. 3C and 3D illustrate cross-sectional side views of the implementations illustrated in FIGS. 3A and 3B respectively.
Figure 3D:
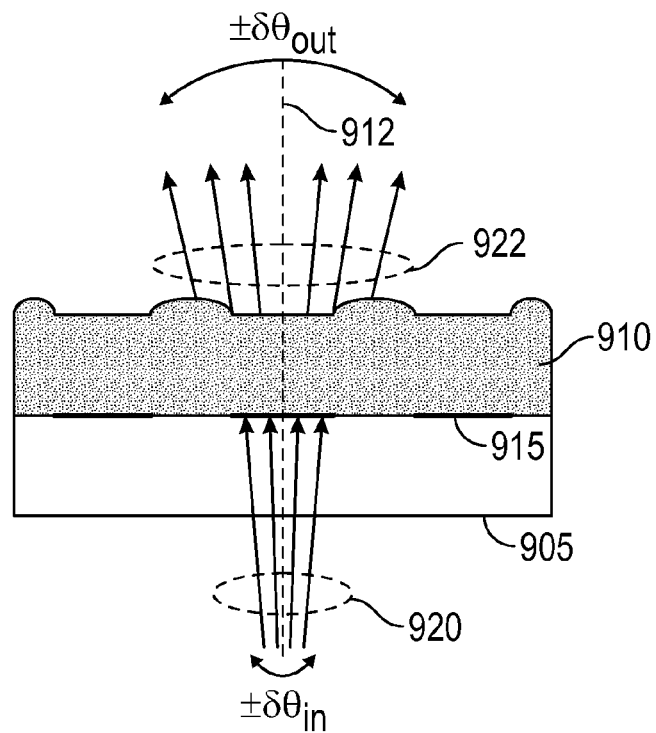

FIGS. 3A and 3B illustrate perspective views of an implementation of a light conditioning sheet that can be electrically controlled to adjust the angular spread and/or radiation pattern of the light output. FIGS. 3C and 3D illustrate cross-sectional side views of the implementation illustrated in FIGS. 3A and 3B respectively. As discussed above, the implementation illustrated in FIGS. 3A-3D can be used as one or both of the angle-spreading sheets 52 and 54 described with reference to and illustrated in FIG. 1B. In some implementations, the electrically controlled light conditioning sheet 900 illustrated in FIGS. 3A-3D can be transmissive to radiation in, for example, the visible spectral region from about 390 nm to about 750 nm. In various implementations, the electrically controlled light conditioning sheet 900 may be transmissive to radiation in ultra-violet and/or infra-red spectral regions in addition to, or alternatively to, the visible spectral region. The electrically controlled light conditioning sheet 900 includes an optional transmissive substrate 905, an electrode 915 including a first and a second conductor and a transmissive elastic layer 910. In various implementations, the electrode 915 can be planar. However, in some implementations, the electrode 915 can be non-planar. The electrode 915 can be transmissive, partially transmissive, or opaque. In various implementations, the electrode is configured to absorb/reflect/scatter less than approximately 10% of the incident light. In implementations including an opaque electrode 915, the electrode can be a small fraction of the overall aperture such that the electrode 915 does not significantly affect the light output of the light conditioning sheet 900. In various implementations, the electrode 915 can have a thickness between approximately 50 nm and 25 mm. In various implementations, the first and second conductors of the electrode 915 can be arranged in a regular or an irregular pattern.

The substrate 905 can include a material that is transmissive to radiation such as, for example, glass, plastic, polyethylene terephthalate (PET), acrylic, etc. In various implementations, the thickness of the substrate 905 can be in the range from approximately 0.5 mm to approximately 1 cm. The substrate 905 can be rigid or flexible. In various implementations, the substrate 905 can provide structural or mechanical stability to the electrically controlled light conditioning sheet 900. In some implementations of the electrically controlled light conditioning sheet 900 the substrate 905 can be omitted.

In various implementations, the electrode 915 can include transparent conductive oxides (for example, indium tin oxide (ITO) or aluminum-doped zinc oxide) or transparent conducting polymers as transparent conducting material. In various implementations, the electrode 915 can have a thickness in the range from approximately 50 nm to approximately 25 µm. In those implementations of the electrically controlled light conditioning sheet 900 that include the substrate 905, the electrode 915 can be disposed on a surface of the substrate 905 or partially or completely embedded in the substrate 905. In various implementations, the electrode 915 can be disposed on a surface of the elastic layer 910 or partially or completely embedded in the elastic layer 910. In various implementations, the electrode 915 can be disposed on a surface of the substrate opposite the surface over which the elastic layer 910 is disposed. The electrode 915 can be disposed on the substrate 905 or the elastic layer 910 using methods such as thin film processing, patterning, lithography, etc. In some implementations, the electrode 915 can be adhered or laminated to a surface of the substrate 905 or the elastic layer 910. In various implementations, the electrode 915 can be partially or completely embedded in the substrate 905 or the elastic layer 910 during the formation of the substrate 905 or the elastic layer 910.

The elastic layer 910 is configured to wrinkle, deform or corrugate in response to an electric field generated by the application of a potential difference between the first and the second conductor of the electrode 915. In various implementations, the elastic layer 910 can include electroactive elastomeric polymers, dielectric elastomers (for example, silicone, acrylic or acrylicates), an ionic polymer-metal composite (IPMC), an electrostrictive material or a piezo-electric material. In various implementations, the elastic layer 910 can include materials that can produce deformations in response to an applied voltage, producing electric fringing field strengths in the elastic layer 910 below the elastic layer 910 material dielectric breakdown strength. In some implementations, the applied voltage can be below 200 Volts. In those implementations of the electrically controlled light conditioning sheet 900 that include the substrate 905, the elastic layer 910 can be disposed over the substrate 905. In various implementations, the elastic layer 910 can be disposed over the substrate 905 using compression molding, casting, spin-coating, dip coating, or other similar manufacturing methods. In various implementations, the thickness of the elastic layer 910 can be in the range from approximately 0.1 µm to approximately 1 cm.

To the extent that the electrically controlled light conditioning sheet 900 does not have an optical power in the absence of an electric field (for example, the substrate 905 and/or the elastic layer 910 does not have optical power in the absence of an electric field), an input beam of light 920 having an angular spread of $\pm\delta\theta_{in}$ with respect to a normal 912 passes through the electrically controlled light conditioning sheet 900 with little to no change in the angular spread $\delta\theta_{out}$ of the output beam 922 as shown in FIG. 3C.

When an electric field is generated across the electrode 915 (for example, by applying a potential difference between the first and the second conductor of the electrode 915), the elastic layer 910 deforms as schematically illustrated in FIGS. 3B and 3D. In various implementations, the electric field can be generated by applying a direct current (DC) or an alternating current (AC) to the electrode 915. Without ascribing to any particular theory, the generated electric field can cause a physical stress or strain on the elastic layer 910 due to the electrostatic force between proximate electrodes. In implementations of the electrically controlled light conditioning sheet 900 including a substrate 905, a lower surface of the elastic layer 910 can be bonded to an upper surface of the substrate 905 such that the lower surface of the elastic surface is clamped. The fringing fields between the first and second conductors of the electrode 915 can produce longitudinal fields which can generate physical stress or strain by pushing or pulling and can cause an upper surface of the elastic layer 910 to deform as illustrated in FIGS. 3B and 3D.

The deformation of the elastic layer 910 can produce regions of optical refractive power 924 including multiple peaks of which 924a is a representative and valleys of which 924b is a representative. The regions of optical refractive power 924 can include microlenses. In various implementations, the microlenses could be lenticular (for example, elongated in one dimension) with a cross-section that is semi-circular, parabolic, hyperbolic, or other curved shape. In various implementations, the microlenses could be lenslets (for example, symmetric or asymmetric lenslets). The characteristics (for example, magnitude, frequency distribution, waveform, shape, or profile) of the applied voltage or current is adjusted such that one of a pitch (PER) of the regions of optical refractive power 924, a height (SAG) of the regions of optical refractive power 924 and/or size of an individual region of optical refractive power is approximately 5-10 times the largest wavelength in the visible spectral region. For example, if the geometry of the electrode 915 and/or the characteristics of the applied voltage or current produces an array of cylindrical-like, spherical or parabolic microlenses, the characteristics of the applied voltage or current is adjusted such that the distance between adjacent microlenses and/or the size of an individual microlens can be approximately 5 or more times greater than the largest wavelength of interest in the visible spectral region (for example, 750 nm). Accordingly, in various implementations, the pitch PER of the regions of optical refractive power 924 and/or size of an individual region of optical refractive power can be in the range from approximately 2 µm-30 µm or more. For example, in some implementations, the pitch PER of the regions of optical refractive power 924 and/or size of an individual region of optical refractive power is between approximately 5 µm and 25 µm or more.

The angular spread and/or radiation pattern (for example, far-field radiation pattern) of the input beam of light 920 can be changed due to the action of the regions of optical refractive power 924. For example, as illustrated in FIG. 3D the input beam of light 920 having an angular spread of $\pm\delta\theta_{in}$ with respect to the normal 912 is transmitted out of the electrically controlled light conditioning sheet 900 as an output beam of light 922 having an angular spread of $\pm\delta\theta_{out}$ with respect to the normal 912 that is different from the angular spread $\pm\delta\theta_{in}$. Although, FIG. 3D illustrates the increased angular spread in a meridional plane parallel to the cross section, it is understood that the electrically controlled light condition sheet 900 can be configured to increase the angular spread in one meridional plane, or in two meridional planes. For example, the pattern of the electrode 915 and the applied electrical signal characteristics may form lenticules or lenslets that can change the angular spread of the incident light in one or more meridional planes (for example, the electrode 915 pattern shown in FIG. 4B). In some implementations, the angular spread of a beam of light can correspond to the full width at half maximum (FWHM) measure of the beam of light.

The angular spread and/or the radiation pattern of the input beam of light 920 can be changed by controlling the shape and the amount of deformation of the elastic layer 910 which in turn is controlled by the characteristics of the applied electric current or voltage signal supplied to the electrodes for a voltage or current source. Accordingly, the angular spread and/or the radiation pattern of the output beam 922 can be controlled electrically. For example, the angular spread and/or the radiation pattern of the output beam 922 can be controlled by adjusting a knob or remotely by a wireless signal. In various implementations, the input beam 920 can be substantially collimated and the elastic layer 910 can be deformed such that the output beam 922 is substantially divergent. In various implementations the input beam 920 can have an angular spread $\pm\delta\theta_{in}$ between approximately ±5 degrees with respect the normal 912 and approximately ±15 degrees with respect the normal 912. After passing through the light conditioning sheet 900, the output beam 922 can have an angular spread $\pm\delta\theta_{out}$ of up to about ±60 degrees from the normal 912. In various implementations, the output beam 922 can have an angular spread $\pm\delta\theta_{out}$ of approximately ±30 degrees from the normal 912 or ±45 degrees from the normal 912. Wider angular distributions may be achievable by virtue of certain voltage waveform patterns that cause crazing (for example, voltage-induced micro crazing or cracking within the bulk of an elastomeric polymer that is self healing upon removal of the driving force) or scattering microstructures in the elastic layer 910. In various implementations, the angular spread and/or radiation pattern of the output beam 922 can be substantially the same as the angular spread and/or radiation pattern of the input beam 920. The angular spread and/or radiation pattern of the output beam 922 can depend on the geometry of the regions of optical refractive power 924 that are produced in the elastic layer 910 which in turn can depend on the potential difference applied. For example, in various implementations, the angular spread and/or radiation pattern of the output beam 922 can depend at least partly on the peak height (SAG) and the pitch (PER) of the optical features that are produced in response to an applied potential difference. In various implementations, the geometry of the electrode 915, the characteristics of the applied electric current or voltage can be adjusted such that the regions of optical refractive power 924 produced by the deformation of the elastic layer 910 are similar to the lenses included in the lens sheets illustrated in and described with reference to FIGS. 2A-2D. Accordingly, the output beam of light 922 can have an angular spread $+\delta\theta_{out}$ and far-field radiation pattern that is similar to the light output by the lens sheets illustrated in and described with reference to FIGS. 2A-2D.

In various implementations, the electrically controlled light conditioning sheet 900 can be configured as a light spreading sheet that is configured to receive an input beam of light having a first angular spread $\pm\delta\theta_{in}$ with respect to the normal 912 and transmit it as an output beam of light having a second angular spread $\pm\delta\theta_{out}$ with respect to the normal 912 in the presence of an electric field. In various implementations, the second angular spread $\pm\delta\theta_{out}$ can be larger than the first angular spread $\pm\delta\theta_{in}$. The increase in the angular spread of the transmitted output beam can be attributed to the interaction of the incoming beam with the regions of optical refractive power that are produced by the electric field. The regions of optical refractive power produced by the electric field can increase the angular spread of the transmitted outgoing beam by using the phenomenon of refraction and bending light according to Snell's law of refraction, which describes the relationship between the angles of incidence and refraction when light passes through a boundary between two different isotropic materials (for example, air and glass, air and plastic, or air and elastic layer 910). Mathematically, Snell's law of refraction is expressed as sin i/sin r=$n_2/n_1$, where i is the angle of incidence of a ray of light that is incident from a medium having a refractive index $n_1$ onto a medium having refractive index $n_2$ and r is the angle of refraction. Using Snell's law, the angular spread of the output beam 922 can be determined for the electrically controlled light conditioning sheet 900 based, at least in part on, refractive indices of the substrate 905, the elastic layer 910 and the output medium (for example, air) and the shape of the deformations of the elastic layer 910. In various implementations, the angular spread and/or the radiation pattern of the output beam 922 can be determined using computer simulations.

Figure 3E:
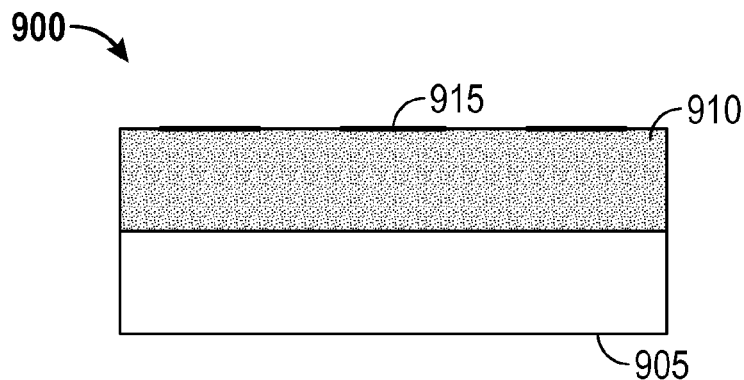
FIG. 3E illustrates cross-sectional side view of an implementation of an electrically controlled light conditioning sheet including an elastic layer and an electrode disposed over the elastic layer.

In the implementations illustrated in FIGS. 3A-3D, the electrode 915 is disposed between the elastic layer 910 and the substrate 905. However in various implementations, the electrode 915 can be disposed over the substrate 905 and the elastic layer 910. For example, FIG. 3E illustrates cross-sectional side view of an implementation of an electrically controlled light conditioning sheet 900 including an elastic layer 910 and an electrode 915 disposed over the elastic layer 910. The electrode 915 can include a regular or irregular pattern of first and second conductors that are disposed over the elastic layer 910. In various implementations, a dielectric layer can be disposed (for example by deposition) over the electrode 915. The dielectric layer can be useful in reducing the electric field strength in the vicinity of the electrode 915 and thus prevent dielectric breakdown of the surrounding material (for example air).

Figure 4A:
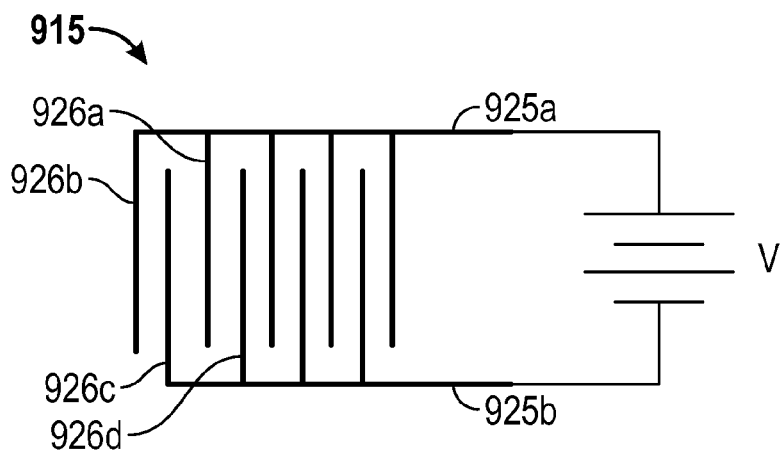
FIGS. 4A and 4B illustrate implementations of an electrode that can be included in implementations of the electrically controlled light conditioning sheets.
Figure 4B:
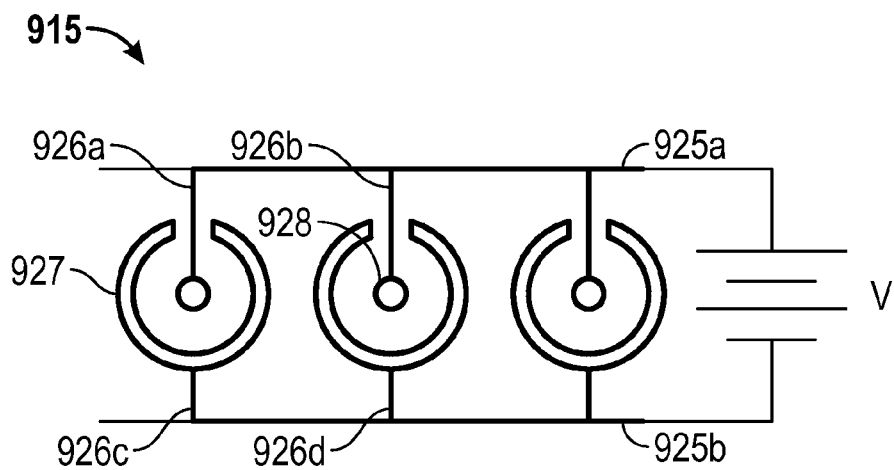

FIGS. 4A and 4B illustrate implementations of a planar electrode that can be included in implementations of the electrically controlled light conditioning sheets. The electrode 915 illustrated in FIGS. 4A and 4B includes a first conductor 925a and a second conductor 925b. The first conductor 925a is electrically insulated from the second conductor 925b. The first conductor has a plurality of conductive extensions of which 926a and 926b are representative extensions and the second conductor has a plurality of conductive extensions of which 926c and 926d are representative extensions. In the implementation illustrated in FIG. 4A the conductive extensions 926a, 926b, 926c and 926d form a plurality of interdigitated lines such that each of the plurality of conductive extensions (for example, 926a and 926b) of the first conductor 925a is adjacent at least one conductive extension (for example, 926c and 926d) of the second conductor 925b. For example, in the illustrated implementations, the conductive extension 926a of the first conductor 925a has adjacent extensions 926c and 926d of the second conductor 925b and extends at least partially between the extensions 926c and 926d.

The plurality of interdigitated lines can be formed of a transparent conducting material and may be directly applied to the substrate 905 or the elastic layer 910. In various implementations, the plurality of interdigitated lines can be formed on another substrate which is applied (for example, by lamination) to substrate 905 or the elastic layer 910. In various implementations, the plurality of interdigitated lines can be formed by lithography. In various implementations, a number of the plurality of interdigitated lines per millimeter of the electrode 915 can be between about 40 lines per mm to about 200 lines per mm. In various implementations, the distance between adjacent interdigitated lines can be between approximately 5 μm and approximately 25 μm. In some implementations, adjacent electrodes are not equally spaced from each other, while in other implementations, adjacent electrodes are equally spaced apart from each other. A DC or an AC voltage or an electric current is applied between the first conductor 925a and the second conductor 925b to generate the electric field that deforms the elastic layer 910. In various implementations, the characteristics of the applied voltage or current are controlled such that a region of optical refractive power is created between adjacent interdigitated lines. Alternately, in some implementations, the characteristics of the applied voltage or current are controlled such that a region of optical refractive power is created between two or more adjacent interdigitated lines. The electrode 915 including a plurality of interdigitated lines can be used to produce a lenticular lens sheet having spherical, parabolic, elliptical or other shaped lenses or elongated substantially cylindrical lenses having spherical, parabolic, elliptical or other shaped cross-section.

Figure 4C:
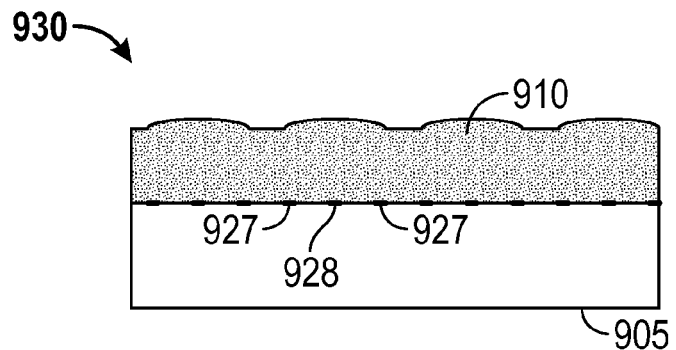
FIG. 4C illustrates a cross-sectional view of the optical features produced by an implementation of an electrically controlled light conditioning sheet including the electrode illustrated in FIG. 4B in the presence of an electrical field.
Figure 4D:
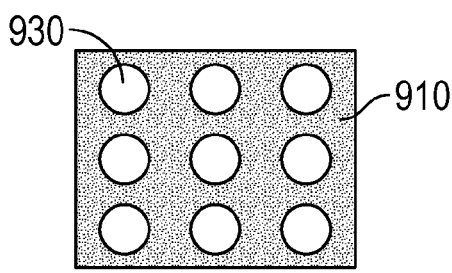
FIG. 4D illustrates a top view of the optical features produced in the implementations of the electrically controlled light conditioning sheet shown in FIG. 4C.

FIG. 4B illustrates an implementation of the electrode 915 that can be used to produce regions of optical refractive power that are spherical or substantially semi-spheroid. FIG. 4C illustrates a cross-sectional view of the optical features produced by an implementation of an electrically controlled light conditioning sheet including the electrode illustrated in FIG. 4B in the presence of an electrical field. When a voltage or a current is applied between the first conductor 925a and the second conductor 925b of the electrode 915 as illustrated in FIG. 4B, the elastic layer 910 can be deformed to produce round or circular lenses 930 as illustrated in FIG. 4C. FIG. 4D illustrates a top view of the optical features produced in the implementations of the electrically controlled light conditioning sheet shown in FIG. 4C. The circular or round shape of the lenses 930 is more clearly illustrated in FIG. 4D. In the implementation of the electrode 915 illustrated in FIG. 4B each of the conductive extensions 926c and 926d of the second conductor 925b includes an arcuate region 927 that at least partially surrounds each of the conductive extensions 926a and 926b of the first conductor 925a. In various implementations, the arcuate region 927 can be circular, elliptical, horseshoe shaped, v-shaped or c-shaped. In the illustrated implementation, each of the conductive extensions 926a and 926b of the first conductor 925a extends into the arcuate region 927 and terminated in an arcuate (for example, circular) region 928. In other implementations, the each of the conductive extensions 926a and 926b of the first conductor 925a can terminate in an elliptical, rectangular, square, trapezoidal or other shaped region. In other implementations, the electrode 915 can have additional conductors (for example, a third conductor). Other configurations of the electrode 915 can be used in various implementations.

The geometry of the electrode 915 and the spacing between the first conductor 925a and 925b can be selected based on the material of the electrode 915 and the electrical and mechanical properties of the elastic layer 910 (for example, dielectric breakdown strength of the material of the elastic layer 910, piezoelectric and/or electrostrictive deformation properties of the elastic layer 910, etc.).

Figure 4E:
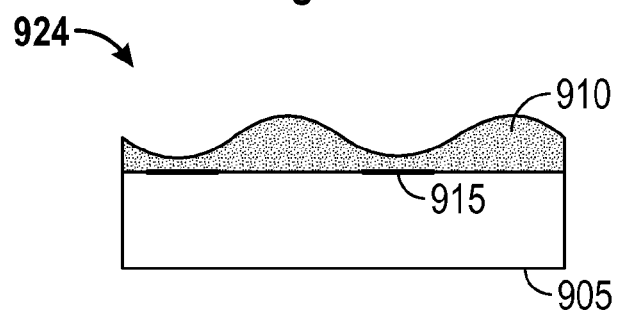
FIGS. 4E and 4F illustrate different micro-optic features that can be produced by various implementations of an electrically controlled light conditioning sheet.
Figure 4F:
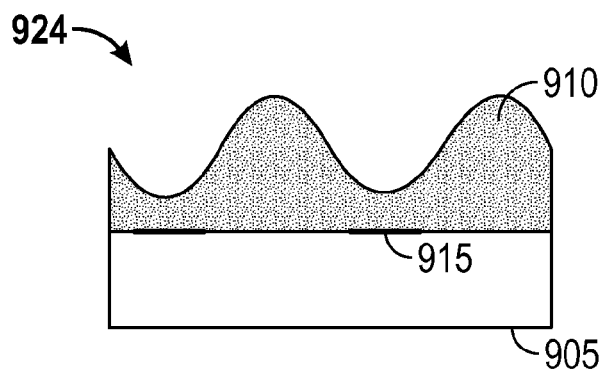

FIGS. 4E and 4F illustrate different micro-optic features that can be produced by various implementations of an electrically controlled light conditioning sheet. For example, the elastic layer 910 can be deformed to produce region of optical refractive power that are convex (as illustrated in FIG. 4E) or sinusoidal (as illustrated in FIG. 4F). In the implementation illustrated in FIG. 4D, the geometry of the electrode 915 and/or the characteristics (for example, magnitude and frequency) of the applied voltage or current signal can be selected such that the elastic layer 910 bulges out in the regions surrounding the electrode 915 such that the regions of the elastic layer 910 over the electrode 915 appear concave. In some implementations, the geometry of the electrode 915 and/or the characteristics (for example, magnitude and frequency) of the applied voltage or current signal can be selected such that the elastic layer 910 bulges out in the regions over the electrode 915 such that the regions of the elastic layer 910 over the electrode 915 appear convex. In various implementations, the elastic layer 910 can be deformed to produce regions having positive and/or negative optical refractive power. Regions of optical refractive power having a wide variety of shapes can be produced by varying the geometry of the electrode 915 and/or the characteristics of the applied electric voltage or current. For example, in various implementations, the applied voltage or current signal supplied or driven to the electrode 915 can have a variety of waveforms (for example, square, sawtooth, triangular, sinusoid, etc.) to produce regions of optical refractive power having a wide variety of shapes.

Figure 5A:
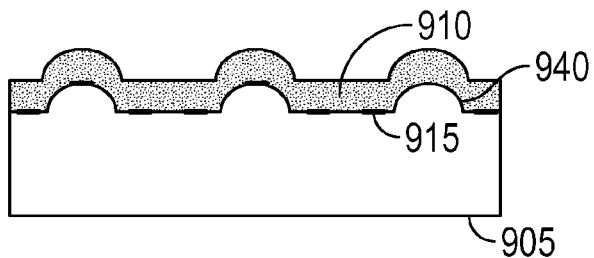
FIGS. 5A and 5B illustrate cross-sectional views of an implementation of an electrically controlled light conditioning sheet, including a substrate, having optical refractive power.
Figure 5B:
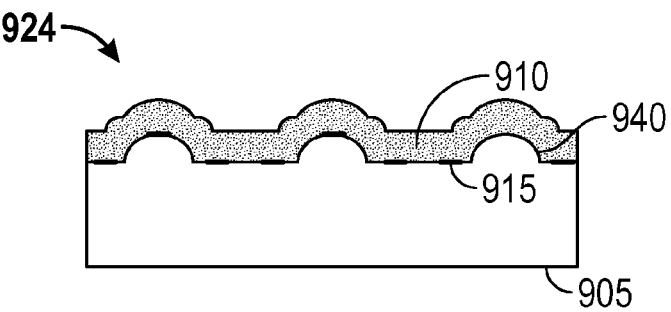

In the implementations illustrated in and described with reference to FIGS. 3A-4F, the substrate 905 and/or the elastic layer 910 are planar and do not have significant optical refractive power in the undeformed state when no voltage or current is applied to the electrode 915. However, in some implementations, the substrate 905 and/or the elastic layer 910 can include regions of optical refractive power in the undeformed state when no voltage or current is applied to the electrode 915. FIGS. 5A and 5B illustrate cross-sectional views of an implementation of an electrically controlled light conditioning sheet including a substrate having optical refractive power.

In various implementations, the elastic layer 910 can be disposed on a substrate 905, the substrate 905 including a fixed lens structure 940. For example, if the angle-spreading sheets 52, 54 of FIG. 1B are lens sheets including lenses having fixed shapes, the elastic layer 910 can be disposed over the angle-spreading sheets 52, 54. In the undeformed state, when no voltage or current is applied to the electrode 915, the angular spread and/or the radiation pattern of an incoming beam of light is altered by the action of the fixed lens structure in accordance with the principles of refraction. When a voltage or current is applied to the electrode 915, regions of optical refractive power 924 are produced in the elastic layer as shown in FIG. 5B so that the angular spread and/or the radiation pattern of a beam of light that is input to or output from the fixed lens structure 940 is altered by the regions of optical refractive power 924.

In some implementations, the elastic layer 910 can be disposed on a planar substrate 905 and a lens structure can be molded or formed on a surface or in the volume of the elastic layer 910 such that the elastic layer 910 has regions of optical refractive power in the undeformed state when no voltage or current is applied to the electrode 915.

As illustrated in FIGS. 3B and 3D, the angular spread of the light is in a plane perpendicular to the longitudinal axis of the peaks/valleys of the deformations. To spread the light in two different planes or meridians, two electrically controlled light conditioning films as those disclosed herein, each film configured to controllably produce elongated lenticules having longitudinal axes that are oriented at an angle to each other (for example, orthogonally) can be used such that the light is affected in two different meridians as illustrated in FIG. 1B. Alternately, two electrodes can be oriented at an angle to each other (for example, orthogonally) such that a single elastic layer 910 can be configured to spread the light in two different planes or meridians. For example, in one implementation of two electrodes oriented at an angle to each other, a first electrode with first and second conductors insulated from each other with elongated extensions extending in a first direction from each of the first and second conductors to form interdigitated lines may be formed on the substrate 905. Elastic layer 910 may then be formed over the first electrode. Then, a second electrode may be formed over the elastic layer 910. The second electrode can include third and fourth conductors insulated from each other with elongated extensions extending in a second direction different from the first direction from each of the first and second conductors to form interdigitated lines.

Various implementations of the electrically controlled light conditioning sheet 900 can include other layers or optical components. For example, in various implementations, the electrically controlled light conditioning sheet 900 can include diffuser layers, brightness enhancing layers, beam-shaping or beam-directing optics, color filters, etc.

As discussed above, implementations of the electrically controlled light conditioning sheet 900 can be used as a component in an illumination system or a luminaire. For example, a source of illumination can be disposed to direct light through the electrically controlled light conditioning sheet 900. The illumination system or luminaire can include a voltage or a current supply and a control circuit that can change the magnitude or shape of the voltage or the current output. Alternately, the illumination system or luminaire can be configured to connect to a source of electrical current or voltage (for example, an electrical outlet in a wall) and include a control circuit that can change the magnitude and/or shape of the electrical current or voltage provided to the electrically controlled light conditioning sheet 900. In some illumination systems or luminaires, the light source can emit a collimated beam or a beam of light that has a small angular spread (for example an angular spread of less than 10 degrees) that is input to the electrically controlled light conditioning sheet 900. By adjusting the optical characteristics of the electrically controlled light conditioning sheet 900 (for example, by adjusting the applied voltage or current), the properties of the light beam output from the illumination system or luminaire can be electronically changed. For example, the shape of the light beam could be electronically changed from a floodlight to a spotlight.

Figure 6:
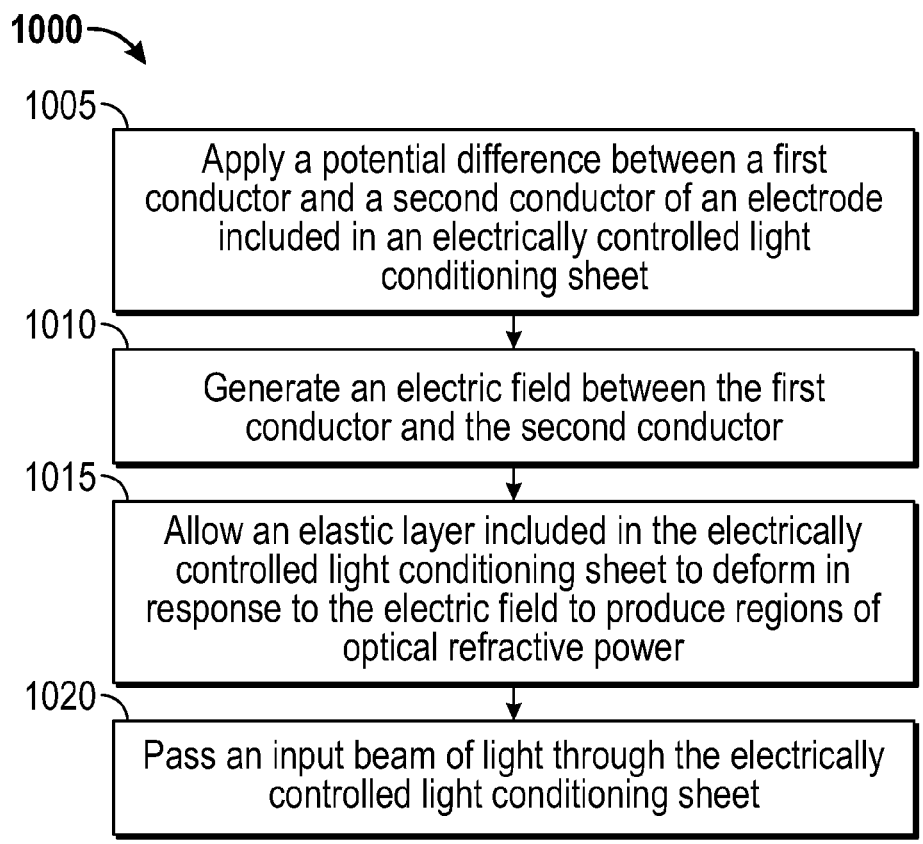
FIG. 6 illustrates a flow chart illustrating an example of a method of using implementations of electrically controlled light conditioning sheet.

FIG. 6 illustrates a flow chart illustrating an example of a method of using implementations of electrically controlled light conditioning sheet. To change the angular spread and/or the radiation pattern of the input beam of light incident on various implementations of an electrically controlled light conditioning sheet 900 described above, a potential difference is applied between a first and a second conductor of an electrode included in the electrically controlled light conditioning sheet 900 as shown in block 1005 of the flow chart 1000 illustrated in FIG. 6. The applied potential difference generates an electric field between the first and the second conductor of the electrode as shown in block 1010 of the flow chart 1000 illustrated in FIG. 6. The elastic layer 910 included in the electrically controlled light conditioning sheet 900 is allowed to deformed in response to the electric field to produce regions of optical refractive power as shown in block 1015 of the flow chart 1000 illustrated in FIG. 6. An input beam of light is passed through the electrically controlled light conditioning sheet as illustrated in block 1020 of the flow chart 1000 illustrated in FIG. 6. As the light passes through regions of optical refractive power, the light transmitted out of the electrically controlled light conditioning sheet 900 has an angular spread and/or radiation pattern that is different from the angular spread and/or radiation pattern of the input beam of light.

Figure 7A:
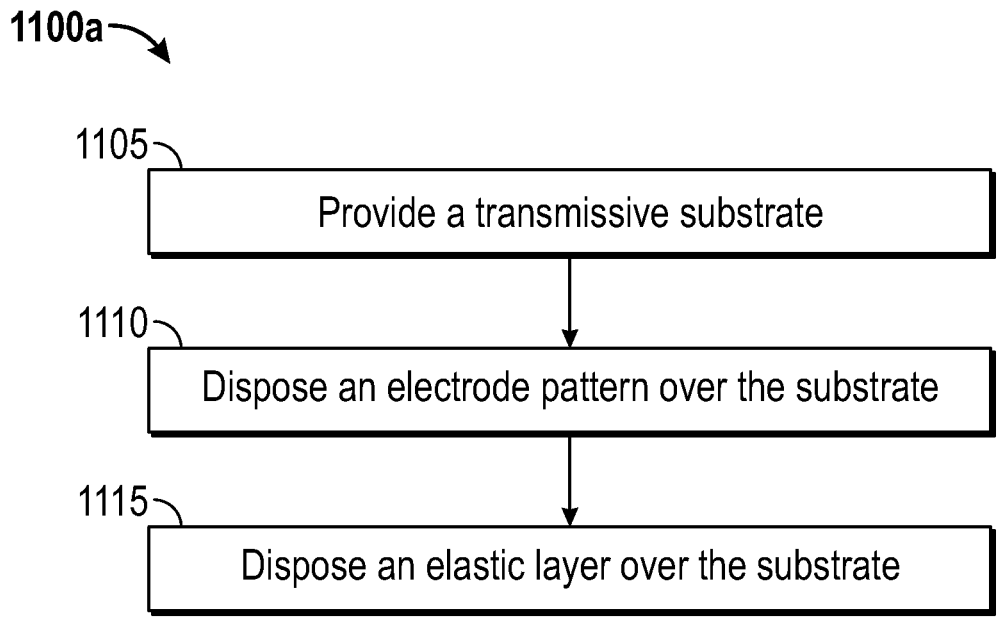
FIGS. 7A and 7B are flow charts illustrating examples of a method of manufacturing various implementations of an electrically controlled light conditioning sheet.
Figure 7B:
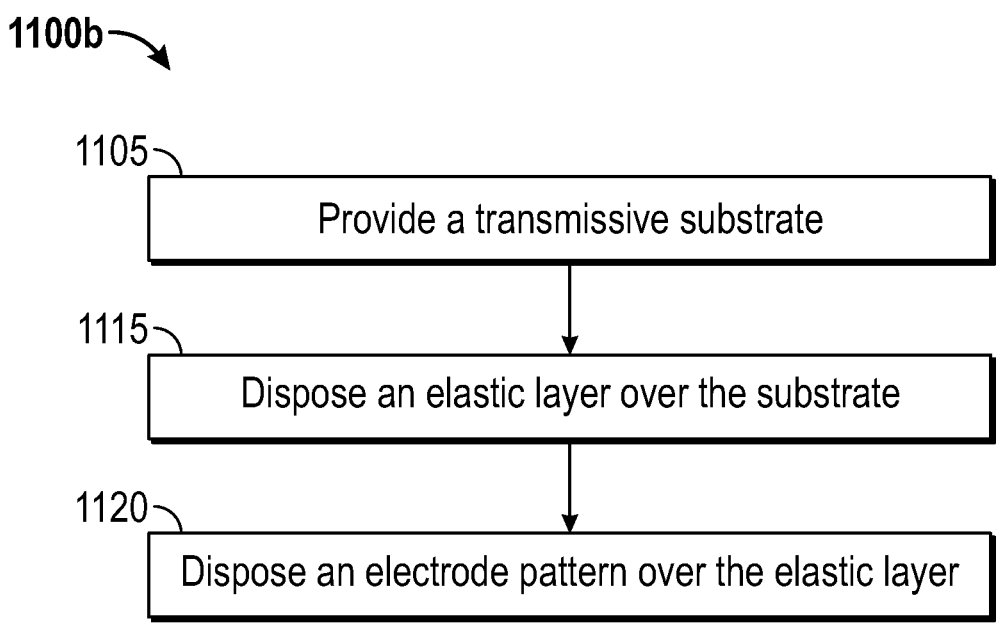

FIGS. 7A and 7B illustrates are flow charts illustrating examples of a method of manufacturing various implementations of an electrically controlled light conditioning sheet. The flow chart 1100a of FIG. 7A includes providing a transmissive substrate as shown in block 1105, disposing an electrode pattern over the substrate as shown in block 1110 and disposing an elastic layer over the substrate as shown in block 1115. In various implementations, the elastic layer is disposed over the substrate such that the electrode pattern is between the substrate and the elastic layer. The flow chart 1100b of FIG. 7B includes providing a transmissive substrate as shown in block 1105, disposing an elastic layer over the substrate as shown in block 1115 and disposing an electrode pattern over the elastic layer as shown in block 1120. In various implementations, a dielectric layer can be disposed over the electrode pattern to reduce the electrical field strength in the vicinity of the electrode pattern to prevent dielectric breakdown of the material in the vicinity of the electrode. The substrate can be similar to the substrate 905 discussed above. The electrode pattern can be similar to the electrode 915 discussed above and the elastic layer can be similar to the elastic layer 910 discussed above. As discussed above, the elastic layer can be disposed over the substrate by using methods, such as, for example, compression molding, casting, spin-coating, and dip coating. The electrode pattern can be disposed over the substrate or the elastic layer by using methods, such as, for example, thin film processing, patterning and/or lithography, bonding, applying, adhering, etc. In various implementations, the electrode pattern can be deposited, adhered or attached to the substrate or the elastic layer. In some implementations, the electrode can be at least partially embedded in the substrate and/or the elastic layer. In various implementations, a second electrode may be disposed on a surface above the first electrode layer.

A wide variety of other variations are also possible. Films, layers, components, and/or elements may be added, removed, or rearranged. Additionally, processing operations may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A transmissive light conditioning film comprising:
   a transmissive solid substrate;
   a planar electrode including a first conductor and a second conductor disposed in the same plane, the first conductor including a plurality of conductive extensions and the second conductor including a plurality of conductive extensions, wherein each of the plurality of conductive extensions of the second conductor includes an arcuate region that partially surrounds a conductive extension of the first conductor, the first conductor electrically insulated from the second conductor, the electrode configured to produce an electric field between the first conductor and the second conductor when a potential difference is applied between the first conductor and the second conductor; and
   a transmissive elastic layer configured to deform and produce regions of refractive power in the transmissive elastic layer in response to the electric field, the regions of refractive power configured to change angular divergence of an input light beam transmitted through the light conditioning film, the regions of refractive power including multiple peaks and valleys;
   wherein a peak-to-valley deformation of the elastic layer is less than about 10% of a thickness of the elastic layer;
   wherein the input beam of light is emitted from a collimated light source, the input beam of light emitted from the collimated source having an angular divergence, $\pm\delta\theta_{in}$, where $\delta\theta_{in}$ is less than 15 degrees from normal to the light conditioning film; and
   wherein control electronics are configured to apply the potential difference that produces the electric field.

2. The light conditioning film of claim 1, wherein each of the plurality of conductive extensions of the first conductor is adjacent to at least one of the plurality of conductive extensions of the second conductor.

3. The light conditioning film of claim 1, wherein the regions of refractive power are configured to increase the angular divergence of the input light beam.

4. The light conditioning film of claim 3, wherein the light conditioning film is configured to output a light beam having an angular spread $\pm\delta\theta_{out}$, $\delta\theta_{out}$ is greater than $\delta\theta_{in}$.

5. The light conditioning film of claim 4, wherein $\delta\theta_{out}$ is greater than about $1.5\delta\theta_{in}$.

6. The light conditioning film of claim 1, wherein the electrode is disposed over the transmissive substrate.

7. The light conditioning film of claim 6, wherein the elastic layer is disposed over the electrode.

8. The light conditioning film of claim 1, wherein the electrode is embedded in the elastic layer.

9. The light conditioning film of claim 1, wherein the transmissive solid substrate includes a region having optical power.

10. The light conditioning film of claim 1, wherein, in the absence of an applied electric field, the transmissive light conditioning film includes at least one region having optical power.

11. The light conditioning film of claim 1, wherein the regions of refractive power include a plurality of substantially spherical regions.

12. The light conditioning film of claim 11, wherein a peak-to-valley deformation of the elastic layer is less than about 10% of a thickness of the elastic layer.

13. The light conditioning film of claim 1, wherein the electrode includes a plurality of interdigitated lines.

14. The light conditioning film of claim 13, wherein a number of the plurality of interdigitated lines per millimeter of the electrode is between 40 lines per mm and 200 lines per mm.

15. The light conditioning film of claim 13, wherein adjacent interdigitated lines are spaced apart by a distance that is between approximately 5 μm and approximately 25 μm.

16. The light conditioning film of claim 13, wherein a region of refractive power is produced between adjacent interdigitated lines.

17. The light conditioning film of claim 1, wherein the regions of refractive power have a pitch that is greater than 5 times the largest wavelength of interest of the input beam.

18. The light conditioning film of claim 1, wherein the regions of optical refractive power have a pitch that is greater than 10 times the wavelength of the input beam.

19. The light conditioning film of claim 1, wherein at least some of the regions of refractive power have a dimension between approximately 5 μm and approximately 25 μm.

20. The light conditioning film of claim 1, wherein the planar electrode is at least partially transmissive to light in the visible spectral range.

21. A lighting device comprising: the light conditioning film of claim 1.

22. The light device of claim 21, including a fixture adapted to receive the collimated light source.

23. A transparent light conditioning film comprising:
   a transparent solid substrate;
   planar means for generating an electric field, the planar generating means including a first and a second means for conducting electricity, the first conducting means including a plurality of conductive extensions and the second conducting means including a plurality of conductive extensions, wherein each of the plurality of conductive extensions of the second conducting means includes an arcuate region that partially surrounds a conductive extension of the first conducting means; and
   means for producing regions of optical refractive power in response to the electric field generated by the generating means, the regions of optical refractive power configured to change angular divergence of an input light beam transmitted through the light conditioning film, the regions of optical refractive power including multiple peaks and valleys;

wherein a peak-to-valley deformation of the optical refractive power producing means is less than about 10% of a thickness of the optical refractive power producing means;

wherein the input beam of light is emitted from a collimated light source, the input beam of light emitted from the collimated source having an angular divergence, $\pm\delta\theta_{in}$, where $\delta\theta_{in}$ is less than 15 degrees from normal to the light conditioning film; and wherein control electronics are configured to apply a potential difference to the planar generating means to generate the electric field.

24. The light conditioning film of claim 23, wherein the generating means includes an electrode, or the means for producing regions of optical refractive power includes an elastic layer.

25. The light conditioning film of claim 4, wherein $\delta\theta_{out}$ is greater than about 40 degrees.

26. The light conditioning film of claim 23, wherein the first and second means for conducting electricity include an electrode.

* * * * *